United States Patent

Noguchi et al.

[15] 3,689,547
[45] Sept. 5, 1972

[54] BENZOHYDROXAMATES

[72] Inventors: Teruhisa Noguchi, Fujisawa; Mitsuo Asada, Hiratsuka; Reiji Sakimoto, Takaoka; Koichi Hashimoto, Tsubatamachi, Kahoku-gun, all of Japan

[73] Assignee: Nippon Soda Co., Ltd., Tokyo, Japan

[22] Filed: March 12, 1970

[21] Appl. No.: 19,083

[52] U.S. Cl. ............................... 260/545 R, 424/315
[51] Int. Cl. ............................................ C07c 119/00
[58] Field of Search ....... 260/477, 471 R, 453, 545 R

[56] References Cited

UNITED STATES PATENTS

| | | | |
|---|---|---|---|
| 3,352,899 | 11/1967 | Taneguche et al. | 224/298 |
| 3,485,865 | 12/1969 | Richter et al. | 260/453 |
| 3,474,132 | 10/1969 | Bernstein | 260/453 |
| 3,444,232 | 5/1969 | Berstein | 260/453 |

FOREIGN PATENTS OR APPLICATIONS

| | | | |
|---|---|---|---|
| 979,562 | 1/1965 | Great Britain | 260/477 |
| 1,221,280 | 2/1971 | Great Britain | 260/453 |
| 1,503,394 | 11/1967 | France | |

Primary Examiner—Lorraine A. Weinberger
Assistant Examiner—R. S. Weissberg
Attorney—George B. Oujevolk

[57] ABSTRACT

The compound having formula:

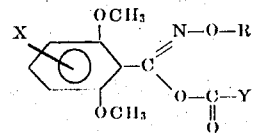

(wherein R represents an alkyl component of one through four carbon atoms, or alkenyl component of one through four carbon atoms, X represents hydrogen, methoxy or halogen and Y represents phenyl or phenyl substituted with methyl, chlorine or nitro) are prepared in accordance with the following equations:

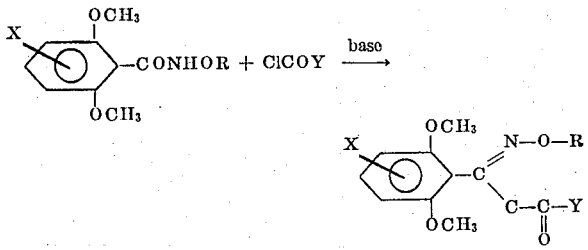

(wherein R, X and Y represent the aforementioned components)

2 Claims, No Drawings

BENZOHYDROXAMATES

This invention relates to novel benzohydroxamates and to a process for the preparation of the same. Further, the invention relates to acaricidal composition containing one or more of said novel compounds.

Phytophagous mites furnish the greatest damage to plants and, in an orchard, a crop free from mite damage is scarcely found. Its damage is very large and a large sum of money for extermination expense is spent annually. Further, some mites having resistance against the currently employed acaricides have appeared recently. Therefore, it becomes a matter of importance to control the mites. Accordingly, development of novel, effective acaricides is desired in order to control these mites.

The inventors have discovered that application of the compounds of this invention, surprisingly, entirely protects or reduces damage to plants due to acarus species, especially Citrus red mite and European red mite, with a small amount and is free from phyto-toxicity.

The novel compounds of this invention are characterized by the following formula:

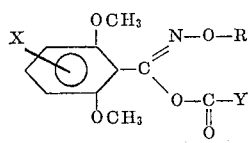

wherein
R represents alkyl of one through four carbon atoms, or alkenyl of one through four carbon atoms,
X represents hydrogen, methoxy or halogen, and Y represents phenyl or phenyl substituted with methyl, chlorine or nitro.

The compounds of this invention have superior acaricidal and mite ovicidal activity against mites such as Citrus red mite (Panonychus citri McGregor), Desert spider mite (tetranychus desertorum Banks) and European red mite (Panonychus ulmi Koch).

The compounds in this invention can be prepared in accordance with the following equation.

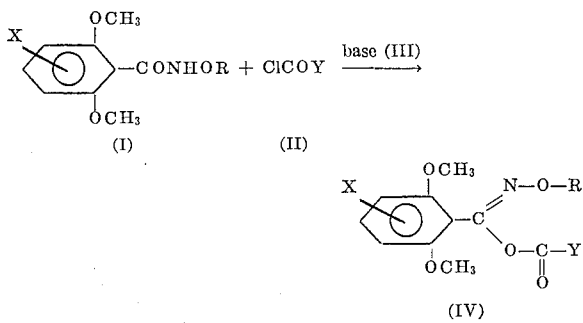

(wherein R, X and Y represent the aforesaid meanings)

Usually the process of the invention is carried out in a proper inert solvent at a temperature of about $-20°$ $-100°$ C. and the reaction terminates between 2 hours and 10 hours.

In the case of using alkali metal hydroxide such as sodium and potassium hydroxide as base (III) in the reaction, an inert solvent such as acetone, methyl ethylketone, chloroform, cyclohenanone, acetonitrile, or tetrahydrofuran is preferably employed at a temperature of about $-20°$-$0°$ C. Water has a tendency to decrease the yield of the products (IV), so generally one should be prepared to add, introduce or mix water to the reaction mixture. However if necessary, the minimum quantity of water may be used. For example, in order to dissolve alkali metal hydroxide a small portion of water may be added.

Furthermore a little amount of amino compounds such as triethyl amine can be added as a catalyst.

After the reaction is terminated, the product (IV) are isolated from the reaction mixture by employing well known treatment. For example, in the case of reaction in a water miscible solvent, after distilling the solvent off under reduced pressure, the residue is dissolved in a non or low polar solvent and aqueous sodium hydroxide solution. In case of reaction in a non or low polar solvent, aqueous sodium hydroxide solution is added into the reaction mixture. In both cases above, the procedure is the same. The mixture consisting of a non or low polar solvent containing the main product (IV) and aqueous sodium hydroxide solution, is shaken. Unreacted starting materials and by-products of organic acids are extracted into sodium hydroxide layer. Organic solvent layer is separated and dried; then the solvent is distilled off. The product (IV) is obtained as crystals having high purity more than 85 percent.

In order to facilitate a clear understanding of the invention, the following preferred specific embodiment is described.

Example 1: Preparation of

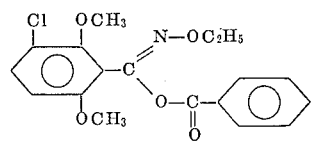

To a solution of 88.8g (3.42 mole) ethyl 3 - chloro - 2,6 - dimethoxy benzohydroxamate and 4.4g (0.0439 mole) triethylamine in 1L of chloroform and 34.2g (0.410 mole) of 40 percent sodium hydroxide aqueous solution, 4.81g (3.42 mole) benzoyl chloride is added dropwise at $-10°$ C. for about a half hour and the mixture is stirred for two more hours at the same temperature.

After the termination of the reaction, the temperature is gradually raised to room temperature. The water layer is separated and removed. To the organic solvent layer, 7g of 48 percent an aqueous solution of sodium hydroxide is added and shaken to form a product in the water layer. A chloroform layer is dried and evaporated to obtain 115.6g of crystals. It was recrystalized from xylene to obtain 100g of pure crystals having melting point of 69°–111° C.

Some typical compounds of this invention are listed in Table 1, along with their property.

These typical compounds in Table 1 merely include some of the compounds of this invention, so that the scope of this invention is not intended to be limited only to those compounds listed in Table 1.

TABLE 1

| No. of compound | Structural formula | Chemical name | Melting point (° C.) |
|---|---|---|---|
| 1 | | Methyl O-benzoyl-2,6-dimethoxybenzohydroximate | 90-9 |
| 2 | | Ethyl O-benzoyl-2,6-dimethoxybenzohydroximate | 57-63 |
| 3 | | Ethyl O-(4-toluoyl)-2,6-dimethoxybenzohydroximate | 96-98 |
| 4 | | Ethyl O-(4-chlorobenzoyl)-2,6-dimethoxybenzohydroximate | 106-108 |
| 5 | | Ethyl O-(-4nitrobenzoyl)-2,6-dimethoxybenzohydroximate | 111-113 |
| 6 | | Allyl O-benzoyl-2,6-dimethoxybenzohydroximate | 43-46 |
| 7 | | Allyl O-(4-toluoyl)-2,6-benzohydroximate | 89-91 |
| 8 | | Butyl O-(4-toluoyl)-3-chloro-2,6-dimethoxybenzohydroximate | 79-81 |
| 9 | | Ethyl O-benzoyl-2,4,6-trimethoxybenzohydroximate | 90.5-92 |
| 10 | | Methyl O-benzoyl-3-chloro-2,6-dimethoxybenzohydroximate | 68-75 |
| 11 | | Methyl O-(4-toluoyl)-3-chloro-2,6-dimethoxybenzohydroximate | 95-96.5 |
| 12 | | Ethyl O-benzoyl-3-chloro2,6-dimethoxybenzohydroximate | 69-71 |

TABLE 1—Continued

| No. of compound | Structural formula | Chemical name | Melting point (° C.) |
|---|---|---|---|
| 13 | (structure) | Ethyl O-(4-toluoyl)-3-chloro-2,6-dimethoxybenzohydroximate | 85–87 |
| 14 | (structure) | Allyl O-(4-toluoyl)-3-chloro-2,6-dimethoxybenzohydroximate | 64–66 |
| 15 | (structure) | Allyl O-(4-toluoyl)-3-chloro-2,6-dimethoxybenzohydroximate | 54–56 |

Hereinafter, the compounds of this invention are represented by Compound No. in Table 1.

In this invention, usually, a small but effective amount of the compound is applied to plant surface by spraying, drenching or dusting to protect or control mites or mite eggs. The concentrations of the active ingredients in the acaricidal compositions of this invention vary according to type of formulation, and they are, for example, used in a range of 5–80 weight percent, preferably 10–60 weight percent, in wettable powders, 5–70 weight percent, preferably 10–50 weight percent, in emulsifiable concentrates, and 0.5–10 weight percent, preferably 1–5 weight percent in dust formulations.

In the above formulation of the composition, auxiliary agents or materials, for example, inert mineral powders such as clay, talc, bentonite, vermuculite and diatomaceous earth, organic solvents such as ethanol, benzene, xylene, kerosine, dimethylformamide and dimethylsulfoxide, dispersing agents such as sodium lignin sulfonate and casein, and wetting agents such as alkylarylsulfonate, higher alcohol sulfate ester, alkyl aryl polyoxyethylene, alkylnaphthalene sulfonate and polyoxyethylene alkylphenol, may be employed according to the type of the formulation for combating mites. Furthermore, the composition may be applied as a mixture with other fungicides, insecticides, acaricides, plant growth regulators and fertilizers.

The non-limiting examples for the acaricidal compositions are illustrated as follows:

EXAMPLE 2

Wettable Powder

| | Parts by Weight |
|---|---|
| Compound 1 | 20 |
| Higher alcohol sulfonate ester | 5 |
| Diatomaceous earth | 75 |

These are mixed and micronized in jet pulverizer to a particle size of 10–30 microns. In practical use, the micronized mixture is diluted to a concentration of 0.01 to 0.05 percent of active ingredient with water. The suspension is applied as spray or drench.

EXAMPLE 3

Emulsifiable Concentrate

| | Parts by Weight |
|---|---|
| Compound 2 | 10 |
| Alkylaryl polyoxyethylene | 5 |
| Dimethylformamide | 50 |
| Xylene | 35 |

These are mixed and dissolved. In practical use, the solution is diluted with water to a concentration of 0.01 to 0.05 percent of active ingredient and this suspension is sprayed or used for drenching.

EXAMPLE 4

Dust Formulation

| | Parts by Weight |
|---|---|
| Compound 3 | 5 |
| Talc | 94.9 |
| Alkylaryl polyoxyethylene | 0.1 |

These were mixed and crushed to fine powder. The dust formulation is usually applied as dusting powder at a rate of 3 to 5 kg. per are.

EXAMPLE 5

Mixed Wettable Powder

| | Parts by Weight |
|---|---|
| Compound 4 | 15 |
| Bis-( 4-chlorophenyl)-methylcarbinol | 15 |
| Higher alcohol sulfonate ester | 4 |
| Sodium alkylnaphthalene sulfonate | 2 |
| Sodium lignin sulfonate | 1 |
| Diatomaceous earth | 63 |

These are mixed, micronized and applied following the procedure of Example 2.

In the Example 2–5, it is not intended to limit the emulsifying, wetting or dispersing agents, carriers and solvents to the ones described by way of illustration.

The compounds listed in Table 1 possess very superior acaricidal activity compared to known compounds.

The superior acaricidal effect of the novel compounds of this invention are clearly illustrated by the following test.

Test 1. Test for Control of Tetranychus mite

About 30 adult female mites of Tetranychus mite (*Tetranychus desertorum*) laid on main leaves of the potted kidney bean plants grown 7 to 10 days stage after sprouting. One day later, the wounded mites are removed from the plants. The compounds to be tested were sprayed on the plants as water suspension containing 0.05% of the compound prepared by the method of Example 2. After 3 days from spraying, adult mortality was counted, and then the surviving adult mites were removed. The viability of eggs deposited during this period was examined after 14 days from spraying.

Adult mortality and ovicidal activity were calculated by the following:

Adult mortality (%): (a− b)/a × 100
  a: number of living mites in untreated plots
  b: number of surviving mites in treated plots
Ovicidal activity (%): (a′ − b′)/a′ × 100
  a′: number of eggs deposited
  b′: number of hatched eggs The rate of adult mortality or ovicidal activity was recorded as follows:

| Adult mortality or Ovicidal activity | Rating |
| --- | --- |
| 100% | +++ |
| 80–99% | ++ |
| 50–79% | + |
| 0–49% | − |

The results are shown in Table 2.

TABLE 2

| Compound No. | Rating | |
| --- | --- | --- |
| | Adult mortality | Ovicidal activity |
| 1 | + | +++ |
| 2 | +++ | +++ |
| 3 | +++ | +++ |
| 4 | ++ | +++ |
| 5 | ++ | +++ |
| 6 | +++ | +++ |
| 7 | +++ | +++ |
| 8 | +++ | +++ |
| 9 | +++ | +++ |
| 10 | + | +++ |
| 11 | ++ | +++ |
| 12 | +++ | +++ |
| 13 | +++ | +++ |
| 14 | +++ | +++ |
| 15 | +++ | +++ |
| 2,4,5,4′-Tetrachloro-diphenylsulfone (control*) | − | +++ |

\* Note: Control is a commercial miticide.

From the foregoing evaluation date, it is apparent that the compounds of this invention are effective acaricide.

We claim:

1. A compound represented by the formula

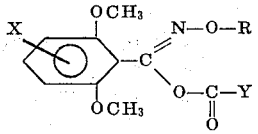

wherein R represents alkyl of one through four carbon atoms, or alkenyl of one through four carbon atoms, X represents hydrogen, methoxy or halogen and Y represents phenyl or phenyl substituted with methyl, chlorine or nitro.

2. A compound selected from the group consisting of

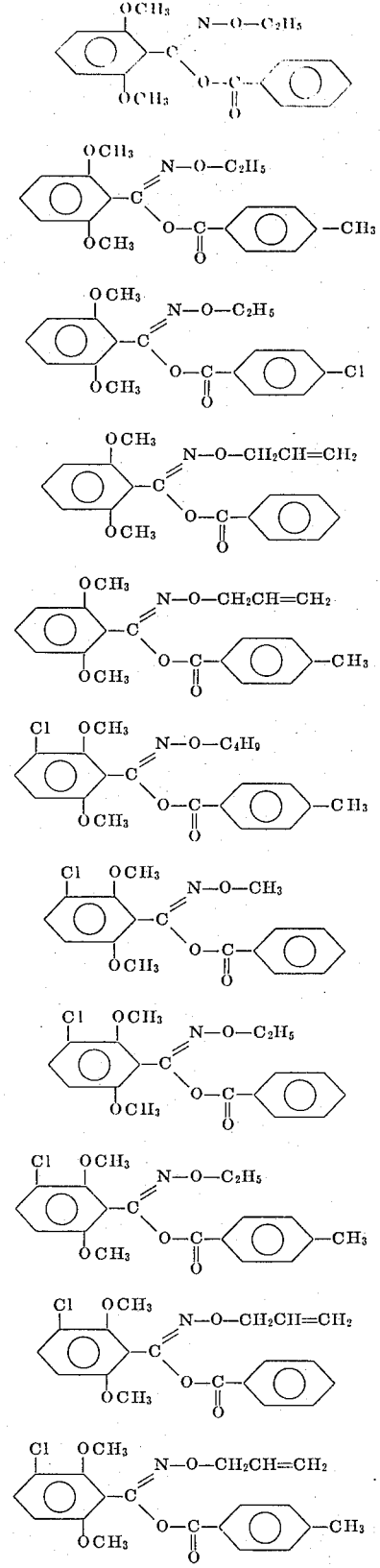

* * * * *